United States Patent [19]

Otala

[11] Patent Number: 4,700,810

[45] Date of Patent: Oct. 20, 1987

[54] METHOD OF CONTROLLING AN ELEVATOR

[75] Inventor: Matti Otala, Helsinki, Finland

[73] Assignee: Kone Elevator GmbH, Baar, Switzerland

[21] Appl. No.: 909,722

[22] Filed: Sep. 22, 1986

[30] Foreign Application Priority Data

Sep. 24, 1985 [FI] Finland ................................ 853672

[51] Int. Cl.[4] ............................................ G05B 15/00

[52] U.S. Cl. .................................... 187/101; 187/130

[58] Field of Search ............... 187/101, 112, 113, 124, 187/129, 130, 134

[56] References Cited

U.S. PATENT DOCUMENTS

| | | | |
|---|---|---|---|
| 4,246,983 | 1/1981 | Bril | 187/101 |
| 4,367,811 | 1/1983 | Yoneda et al. | 187/129 |
| 4,397,377 | 8/1983 | Husson et al. | 187/124 |
| 4,440,266 | 4/1984 | Köhler | 187/134 X |
| 4,483,418 | 11/1984 | Umeda et al. | 187/124 |

*Primary Examiner*—William M. Shoop, Jr.

*Assistant Examiner*—W. E. Duncanson, Jr.

*Attorney, Agent, or Firm*—Sughrue, Mion, Zinn, Macpeak & Seas

[57] ABSTRACT

A procedure for entering into an elevator control computer information specific to a particular installation of an elevator provided with operating devices capable of data transfer includes employing a computer test programme to map elevators used in the particular installation and their positions by sending out a query round to addresses which are tabulated in the computer and which represent all possible operating devices, and by inferring the kind and number of the action means present in the installation on the basis of the answers received in the query round. During a test travel of the elevator, by activating and reading the devices the location of the devices, the geometry of the building and the distances between floors are sensed. All the information thus received and which is necessary for controlling the elevator is stored permanently in the memory of the control computer, to enable normal operation of the elevator in the installation.

4 Claims, 2 Drawing Figures

METHOD OF CONTROLLING AN ELEVATOR

FIELD OF THE INVENTION

The present invention concerns a procedure for entering the installation specific information of an elevator provided with action means capable of digital data transfer, in the elevator's control computer.

BACKGROUND OF THE INVENTION

It is nowadays necessary in the installation of an elevator, in custom design work, to spend considerable time on consideration of the architecture of the particular building in which the elevator is being installed. It has been calculated that the custom planning consumes up to and over 20% of the work time spent in making the elevator at the manufacturing plant, when the elevator is a standard product. A lot of extra work to be done in custom designing arises, for instance, from potentially different distances between floors in the building, from unevenness of the shaft walls or guides, or from alterations of the elevator which have to be made on site.

In modern computer-controlled elevator systems, many kinds of testing and control programmes which report on the status and operations of the elevator and control the performance of different functions are employed. On the other hand no systems exist which would aim at a mapping of the building, although the utilization of such as a source of information serving to educate the elevator's control computer would bring obvious advantage. Therefore, the object of the present invention is to eliminate the problems encountered heretofore, and to provide, in an elevator system based on distributed intelligence, a system by the aid of which the custom design work on the elevator can be substantially reduced.

BRIEF SUMMARY OF THE INVENTION

The present invention provides a procedure for entering into an elevator control computer information specific to a particular installation of an elevator provided with action means capable of data transfer, which includes employing a computer test programme to map elevators used in the particular installation and their positions, by sending out a query round to addresses which are tabulated in the computer and which represent all action means that are possible, and by inferring the kind and number of the action means present in the installation on the basis of the answers received in the query round, by running a test travel, during which by activating and reading the action means the location of the action means, the geometry of the building and the distances between floors are sensed, and by storing all the information thus received which is necessary for controlling the elevator, permanently in the memory of the control computer, to enable normal operation of the elevator in the installation which is the object of the mapping.

Thus, the basic concept of the procedure of the invention is that an entirely series-produced elevator is brought into a building and installed in its place, and it is taught the geometry of the building and the composition of its elevator system. Reindoctrination is easy to accomplish, for instance after alterations have been made in the building in connection with modernizing of the elevator or because of distortions appearing in the course of time, e.g. in the elevator's guide rails and which give rise to incorrect running.

Implementation of the present invention is facilitated by the use, throughout the elevator system, of signalling devices based on distributed intelligence and at a data transfer network (e.g. a serial digital loop) for connecting the devices to the control computer of the elevator system.

Preferably, as a result of the mapping by the control computer those tabulated addresses which fail to answer in the query round are deleted from the address register to be used thence-forward and the remaining elements of the address table are rearranged to be in a sequence which is logical from the viewpoint of processing. In applications of this type, in which the control computer performs simultaneously several monitoring and control tasks, the speed of data processing is critical, and it is therefore of advantage to eliminate all addresses which are not used. If, as is usually the case, the table has been stored in a so-called direct access memory, the rearrangement of the table does not in itself result in greater speed as to the access times, but a logically organized memory map makes for better understanding of the system and facilitates any changes of the system that have to be made.

The information that is permanently stored in the memory of the control computer may be placed in a protected long-term memory to which writing is only possible in connection with indoctrination. Among the advantages may be mentioned the fact that the information will even be preserved during mains failure.

The density of information moving in the serial digital loops connecting the signalling devices of the elevator with the control computer may be polled by the control computer in rotation, and on the basis of this traffic density a priority ranking may be assigned to the loops. The advantages include insensitivity to faults, due to the character of serial loops, (one branch of the loop may be interrupted without embarrassing the data transfer) and the rapid directing of attention to a given loop in which something is going on.

DESCRIPTION OF THE DRAWINGS

Further features, advantages and objects of the invention will appear from the following description thereof when taken in conjunction with the accompanying drawing, wherein.

DESCRIPTION OF THE PREFERRED EMBODIMENT

Figure 1:
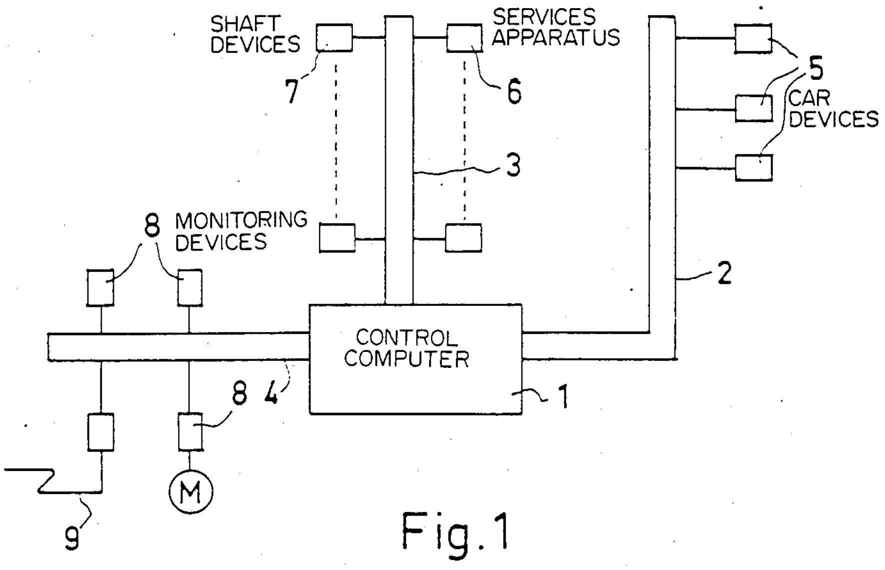
FIG. 1 shows an advantageous elevator control system based on three serial digital loops and in which the procedure of the invention may be applied.

FIG. 1 illustrates the way in which information is transmitted in an elevator control system with the aid of serial digital loops, which have been connected to a central computer. In the Figure, the elevator control computer has been indicated by reference numeral 1, and to it have been connected three serial digital loops 2, 3 and 4. Information passes in these loops in such a manner that the car loop 2 connects devices 5 in the elevator car (press button station, floor display, etc.) with the elevator control computer or central unit 1; the shaft and door loop 3 connects devices 7 in the shaft (in the first place various switches) and the service apparatus 6 associated with the elevator door (floor-specific call button stations) to the control computer; while the third, or outer loop 4 connects different monitoring and reporting devices and elevator motor control apparatus 8 to the control computer 1. Reference numeral 9 has furthermore been employed to indicate an information transfer connection to the outside world—for instance, a telephone line or radio link connection to the offices of the servicing company may be contemplated.

The control computer 1 monitors in rotation the density of information in transit in the loops 2–4 and on the basis thereof assigns priority ranking to them. In a normal situation, the information makes the circuit of the loops in such a manner that the information sent out by one branch of the loop is circulated back by the other branch so that the transmitting device may check whether the transmitted information has travelled correctly through the loop.

In an exemplary system of this type, indoctrination of the elevator takes place, in detail, in two steps, as follows:

Step 1:

The elevator control computer sends out on the serial traffic routes all calls that are possible. The addresses have the character of possible action means. During this step, the so-called query round, the elevator is stationary. The computer detects whether there is an answer or none. If there is an answer, it contains an identification (the code stored at the respective address). By comparing the code received with a separate table of codes, containing for instance the address of the subroutine to be performed for each code, the computer knows in each instance what to do with the elevator's action means that is being addressed. In this way, by directing in principle a reading operation to all memory locations set aside for action means, the control computer goes through this part of its address space and observes which ones of the addresses are active and what is the character of their action means, of those that have notified their presence. Addresses which fail to answer are zeroed out, and those which have answered are regrouped in a functional table (for instance, all push buttons in one group).

Step 2:

The control computer performs a mapping of its physical life environment. It starts the motor, runs up from below and down from the top a few times, slowly at constant speed. When the elevator arrives at a given floor, it detects reception of a pulse, e.g. from a unit the code of which is located at a particular memory location. The computer looks up in the memory and finds that the code of a shaft switch, e.g. a floor level switch has been stored at that memory location. The computer then stops the elevator and applies an opening command to the door and a command to switch on all floor lamps. When the door has opened, it finds out which door lamp went out and/or on which floor a direction arrow was eliminated. If, for instance, the lamp at one specific address was extinguished, the computer looks up in its code table the meaning of the code entered at that address and observes, for instance, that at that address is found the floor level indicator lamp of the 5th floor, where it therefore is at the moment. The process goes on until the physical environment has been mapped. Since the elevator travels with constant velocity, the distance between floors can be calculated from the time spent between floors. All functions are tested and the acknowledgements monitored, and thereby information is gained as to where each device is located.

Summarizing, it will thus be understood that the elevator control computer finds the answers to the following questions:

(1) Which action means are included in the system?

(2) What is their location, the floor spacing, the geometry?

When this indoctrination procedure has been completed, the computer has in its memory information describing its life environment (which may e.g. be compared to the equivalent of a baby first learning its life environment by touch).

The indoctrination procedure can be carried out whenever necessary, for instance when an elevator system is being modernized. This sytem requires a protected long-term memory in the central unit. This long-term memory is a memory unit separate from the working memory and to which no information can be written until a "Learn" button is pressed when performing indoctrination. Due to battery back-up, the information will not disappear from the long-term memory even in the event of mains failure.

Figure 2:
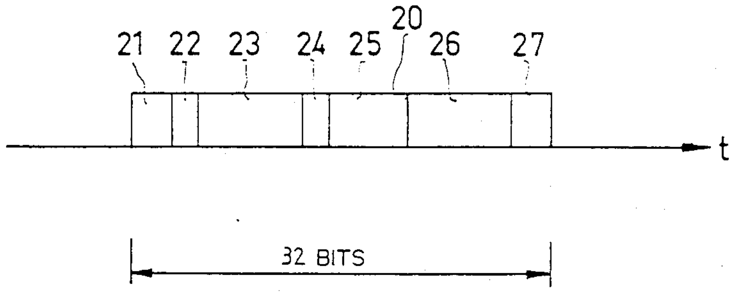
FIG. 2 shows a suggested data pattern.

In FIG. 2 there is shown an example of a serial mode, 32-bit standard message 20 used in the loops. The numbers inside the blocks indicate the number of bits reserved for each block. Reference numeral 21 indicates a start block, which activates the serial loop. Block 22 is an identification code of the transmitting device, block 23 contains the address of the transmission, block 24 identifies the type of information transmitted, block 25 contains the message that is being transmitted, block 26 contains the CRC error detection code, and block 27 is a stop code, which terminates the message.

It will be obvious to persons skilled in the art that different embodiments of the invention are not restricted to the example presented in the foregoing and that they may vary within the scope of the claims stated below.

I claim:

1. A procedure for entering into an elevator control computer information specific to a particular installation of an elevator provided with action means capable of data transfer, which includes employing a computer test programme to map elevators used in the particular installation and their positions;

by sending out a query round to addresses which are tabulated in the computer and which represent all action means that are possible, and by inferring the kind and number of the action means present in the installation on the basis of the answers received in the query round;

by running a test travel, during which by activating and reading the action means the location of the action means, the geometry of the building and the distances between floors are sensed; and by storing all the information thus received which is necessary for controlling the elevator, permanently in the memory of the control computer, to enable normal operation of the elevator in the installation which is the object of the mapping.

2. A procedure according to claim 1, wherein as a result of the mapping by the control computer those tabulated addresses which fail to answer in the query round are deleted from the address register to be used thence-forward and the remaining elements of the address table are rearranged to be in a sequence which is logical from the viewpoint of processing.

3. A procedure according to claim 1, wherein the information to be permanently stored in the memory of said control computer is placed in a protected long-term memory to which writing is possible only in connection with said information entry procedure.

4. A procedure according to claim 1 wherein the density of data moving in serial digital loops connecting signalling devices of said elevator with the control computer is polled by the control computer, a priority ranking being assigned to the loops on the basis of the traffic density in said serial loops.

* * * * *